(12) United States Patent
Gorinevsky

(10) Patent No.: US 11,016,479 B2
(45) Date of Patent: May 25, 2021

(54) SYSTEM AND METHOD FOR FLEET RELIABITY MONITORING

(71) Applicant: Mitek Analytics LLC, Palo Alto, CA (US)

(72) Inventor: Dimitry Gorinevsky, Palo Alto, CA (US)

(73) Assignee: Mitek Analytics LLC, Palo Alto, CA (US)

( * ) Notice: Subject to any disclaimer, the term of this patent is extended or adjusted under 35 U.S.C. 154(b) by 328 days.

(21) Appl. No.: 15/595,972

(22) Filed: May 16, 2017

(65) Prior Publication Data
US 2018/0335772 A1 Nov. 22, 2018

(51) Int. Cl.
G05B 23/02 (2006.01)
G06F 11/00 (2006.01)
G06Q 10/00 (2012.01)
G06Q 10/06 (2012.01)
G06F 16/00 (2019.01)

(52) U.S. Cl.
CPC ..... *G05B 23/0283* (2013.01); *G05B 23/0224* (2013.01); *G06F 11/008* (2013.01); *G06Q 10/063* (2013.01); *G06Q 10/20* (2013.01); *G06F 16/00* (2019.01)

(58) Field of Classification Search
CPC ............ G05B 23/0283; G05B 23/0224; G06Q 10/063; G06Q 10/20; G06F 11/008; G06F 16/00
See application file for complete search history.

(56) References Cited

U.S. PATENT DOCUMENTS

| | | | |
|---|---|---|---|
| 2003/0158803 A1* | 8/2003 | Darken | G06Q 40/06 705/36 R |
| 2007/0168050 A1* | 7/2007 | Chambers | G05B 15/02 700/11 |
| 2009/0312897 A1* | 12/2009 | Jamrosz | G06Q 10/06 701/32.1 |
| 2011/0054806 A1* | 3/2011 | Goldfine | G07C 3/00 702/34 |
| 2013/0268501 A1* | 10/2013 | Gorinevsky | G06Q 10/0639 707/693 |
| 2018/0136288 A1* | 5/2018 | Wolfe | G01R 31/40 |

* cited by examiner

*Primary Examiner* — Mohammad K Islam
(74) *Attorney, Agent, or Firm* — TransPacific Law Group; Pavel I. Pogodin, Esq.

(57) ABSTRACT

A computer-based monitoring system and monitoring method implemented in computer software for analyzing the reliability data collected in the maintenance and repair operations in a fleet of assets with parts of the same type over a period of time. The reliability data include reliability event data, such as failures, repairs, and replacements of the parts. The reliability data further include asset usage data, such as usage time, or usage missions, or usage mileage, or usage flight hours, or such. The monitoring system analyses historical reliability data to build a reliability model. This model is further used in reliability SPC algorithms detecting bad actor assets and bad actor parts that show consistently worse reliability than normal parts and assets.

16 Claims, 14 Drawing Sheets

System Overview

Reliability Rules

| Rule # | Threshold | Rule Formulation |
|---|---|---|
| 1 | $A_1$ | One sample below $A_1$ |
| 2 | $A_2$ | Two consecutive samples below $A_2$ |
| 3 | $A_3$ | Three consecutive samples below $A_3$ |
| 4 | $A_3$ | Four out of five consecutive samples below $A_3$ |

FIG. 8

Bad Part Report

| Bad Part | Last Instl | Rule | Badness |
|---|---|---|---|
| 1000xxxxxx | 25-Oct-15 | 3 | 28.6 |
| 1000xxxxY | 24-Dec-15 | 2 | 36.6 |
| 1000xxxYX | 02-Apr-16 | 3 4 | 27.1 |
| 1000xxxYY | 19-Sep-14 | 3 | 21.1 |
| 1000xxxxZ | 16-Jan-15 | 3 | 17.7 |
| 1000xxxZX | 31-Apr-15 | 3 | 21.2 |
| 1000xxZxx | 05-Jul-16 | 3 | 51.2 |
| 1000xZxxx | 03-Feb-16 | 3 | 28.1 |
| 1000Zxxxx | 19-Jul-15 | 3 | 25.0 |
| 1000xxxYZ | 18-Oct-15 | 2 | 40.4 |
| 1000xxxZZ | 14-May-16 | 3 4 | 13.0 |
| 1000xxYYZ | 15-Jun-16 | 3 | 15.4 |
| 1000xxZYZ | 17-Apr-16 | 3 | 29.0 |
| 1000xxYxx | 31-Oct-15 | 3 | 34.9 |
| 1000Yxxxx | 05-Jun-16 | 4 | 19.2 |

FIG. 10

Bad Asset Report

```
  ╭1100       ╭1110          ╭1120    ╭1130
  Bad Asset | Last Instl | Rule | Badness
  xx0000YYYY | 18-Feb-15  |  4   |  9.2
  xx0000YYYZ | 23-Sep-16  |  3   | 39.4
```

FIG. 11

Bad Part Detail Report

| Part | Installed | Usage |
|------|-----------|-------|
| 1000xxxxY | 18-Feb-14 | 85.8 |
| 1000xxxxY | 20-Jun-14 | 3.4 |
| 1000xxxxY | 20-Jul-14 | 101.2 |
| 1000xxxxY | 09-Nov-14 | 309.4 |
| 1000xxxxY | 20-Oct-15 | 151.7 |
| *1000xxxxY* | *14-Mar-16* | *7.9* |
| *1000xxxxY* | *26-May-16* | *1.5* |
| *1000xxxxY* | *12-Oct-16* | *6.0* |

FIG. 12

Bad Asset Detail Report

```
 ┌ 1300      ┌ 1310       ┌ 1320
 Asset      | Installed  | Usage
------------|------------|--------
 xx0000YYYZ | 29-Jul-12  |  80.8
 xx0000YYYZ | 12-Nov-12  | 303.6
 xx0000YYYZ | 11-Oct-13  | 293.8
 xx0000YYYZ | 12-Jan-14  |  12.1
 xx0000YYYZ | 31-Feb-14  |  10.5
 xx0000YYYZ | 28-Mar-14  | 255.6
 xx0000YYYZ | 30-May-15  |  80.1
 xx0000YYYZ | 18-Oct-15  | 129.3
 xx0000YYYZ | 23-Jan-16  |  32.1    ← 1330
 xx0000YYYZ | 04-Mar-16  |   5.6    ← 1340
 xx0000YYYZ | 26-Jun-16  |   6.8    ← 1340
 xx0000YYYZ | 04-Aug-16  |   3.5
```

FIG. 13

SYSTEM AND METHOD FOR FLEET RELIABITY MONITORING

The U.S. Government may have certain rights in this invention pursuant to SBIR Contract No. FA8222-16-C-0001 awarded by the Air Force Sustainment Center at Hill Air Force Base, UT 84056.

BACKGROUND OF THE INVENTION

Field of the Invention

This invention generally belong to the class of monitoring systems that use data gathered from business operation involving physical assets and that perform computational processing of such data to provide alerts, warnings, and other decision support information to human operators.

Description of the Related Art

The majority of the prior work on monitoring systems is in the areas of monitoring industrial manufacturing processes or monitoring operating equipment or monitoring other physical assets for anomalies or malfunctions. There is much less prior work in the area of monitoring the processes for sustainment of assets in Maintenance and Repair Operations (MRO), which is the general area of this invention.

Monitoring and reporting of anomalies in various business and physical processes and systems could serve one or more purposes including quality assurance for manufacturing processes, improvement of operations safety (early warning of incipient problem), condition-based maintenance (CBM) of the assets, and performance monitoring with the purpose of adjusting the operation in case of anomaly.

The word "asset" as used herein may include a machine, an industrial plant, a vehicle, a device, an appliance, an apparatus, a machine, an instrument, an electronic system, a computer system, a manufacturing process, a building, a facility, a utility system, a data center, a computer network, or other engineered system. "Monitoring system" herein includes data management, monitoring methods, computational logic implementing the monitoring methods, software services supplementing the computational logic, systems architecture, and an arrangement for reporting the monitoring results.

It is well known in the industry that for complex assets such as heavy ground vehicles, aircraft, marine vehicles, industrial plants, manufacturing systems, buildings, utilities, and others the sustainment costs could be up to 80% of the lifecycle costs. Thus, optimizing sustainment of such systems is an important business problem. Monitoring the sustainment (MRO) processes allows identifying and addressing the bad actor items that could disproportionally increase the overall sustainment costs for a fleet (population) of such assets.

Here, and further in this patent, the word asset is used to describe a system, device, vehicle, plant, building, or other engineered object that is operated independently of other assets in a fleet (population) of the assets. The word part is used to describe a subsystem, line replaceable unit, assembly, or other part of the asset that can be removed from the asset, repaired, and installed back. The parts are usually interchangeable between the assets of the same type. Each part might contain subparts, which in turn can contain subsystems or subparts at several levels of hierarchy (indenture levels). In this disclosure, 'part' might mean any of such systems, parts, subsystems, or subparts at any indenture level.

The form of monitoring known as Statistical Process Control (SPC), has been extensively used for several decades. SPC has been introduced for quality assurance when the monitored asset is a manufacturing process. The SPC methods compare time series for a selected measured or computed parameter against thresholds; threshold exceedances or their combinations are reported as anomalies. The SPC allows detecting undesirable changes after observing a small number of abnormal data points. The SPC is mostly used in process control where it is important to detect anomaly quickly after it has occured because during the time period after the anomaly has occured and before it is detected the process might result in reject product, which leads to economic losses. The same property of the SPC would be desirable to have for the reliability monitoring of asset fleet, which is the subject of this invention, because there are losses associated with continuing operation of the bad assets or bad parts in the fleet.

SUMMARY OF THE INVENTION

The inventive methodology is directed to methods and systems that substantially obviate one or more of the above and other problems associated with conventional techniques for monitoring reliability data in sustainment of asset fleets.

In accordance with one aspect of the invention, there is provided a system and method for monitoring reliability data for a fleet of the assets, where the assets are of similar design and used in similar ways and each asset includes at least one part. Each asset has a unique asset serial number and each part has a unique part serial number. The fleet of the assets is sustained over a period of time where sustainment includes repairs and replacements of failed asset parts. In the preferred embodiment, each failed part in the asset can be replaced by other part of the same type; replacing a failed part allows for continuing asset operation. A failed part can be removed from the asset, repaired, and installed to the same or another asset.

Reliability data is collected for the fleet of assets and the fleet of the parts over a period of time. Various embodiments of the inventive concept allow several reliability datastores, each storing a part of the fleet reliability data. In the preferred embodiment, the collected reliability data includes data on reliability events comprising (i) data on part installations and removals for the fleet and information on whether the part removal was caused by a failure or some other reason and (ii) part serial number data or data that that allow uniquely identify the part(s) and the asset involved into each reliability event.

In the preferred embodiment, the collected reliability data further includes data on part usage between part install and part removal or between the part install and a given time. In one embodiment, the usage of the part is the same as the usage of the asset, on which it is installed, on the same period of time. Various embodiments of the inventive concept allow the asset usage data that include but are not limited to the asset time in operation, asset operation cycles, number of asset missions, number of starts, the time of active operation, the cumulative usage intensity, and previous reliability period usage.

In the preferred embodiment, the collected reliability data is computationally processed using a method comprising automated modeling analytics function and decision support analytics functions; the method provides results of the computational processing (monitoring) in the form of actionable decision support information. In one or more embodiments, the method obtains reliability data for the computational processing from one or more reliability datastores.

In one or many embodiments, the modeling analytics function and the decision support analytics functions each represent the fleet of the parts as a collection of normal parts and bad actor parts where (i) All normal parts have the same reliability characteristics, and (ii) Bad actor parts have higher risk of failure under the same usage and operating conditions compared to the normal parts.

In one or more embodiments, the modeling analytics function computes fleet reliability model, which provides probability distribution model for failure event probability of a normal part depending on part usage and other relevant factors. The fleet reliability model describes the risk of part failure depending on the usage and other relevant factors exemplified by operating conditions, repair conditions, repair type, initial state of the part when installed in the asset, usage pattern, ambient conditions, and other factors that characterize the asset operations or sustainment and can be collected in the reliability datastores comprising the reliability data.

In one or more embodiments, the modeling analytics function includes data cleanup procedure that flags data records that are inconsistent, suspected to be spurious, contain manual data entry errors, or are otherwise unsuitable for the modeling, and removes the flagged data records from the modeling or repairs the flagged data records by modifying the data to remove the observed inconsistencies, In one or more embodiments, the fleet reliability model is determined by fitting the probability distribution model to the collected reliability data by iteratively computing the list of the bad actors parts and excluding the data for these parts from the next iteration of the reliability model fitting.

In one or more embodiments, the decision support analytics uses fleet reliability model to process the reliability and usage data covering a given period in time. The decision support analytics computes a list of bad actors and includes values of badness statistics for each bad actor, where the values of badness statistics prioritize the bad actors; the decision support information is computed using fleet reliability model and based on reliability and usage data In the preferred embodiment, the decision support analytics determines bad actors by applying reliability SPC rules to the usages between the part installations and part failure where the reliability SPC rule thresholds are computed based on fleet reliability model. Various embodiments might use one or more of the reliability SPC rules that are described below.

The first reliability SPC rule is that the usage interval before failure is less than the first threshold. The second reliability SPC rule is that two consecutive usage intervals before failures are both less than the second threshold. The third reliability SPC rule is that the three consecutive usage intervals before failures are all less than the third threshold/ The fourth reliability SPC rule is that at least four out of five consecutive usage intervals before failure are all less than the third threshold.

In the preferred embodiment, the thresholds in the reliability SPC rules are computed based on the probability distribution in the reliability model such that firing of each reliability rule has a given, small, probability to be a false positive detection of the data from normal assets and parts. In one of more embodiments, the said false positive probability can be used as a tuning parameter that makes the reliability SPC rule thresholds smaller or larger and the list of detected bad actors shorter or longer depending on the tuning parameter value.

Various embodiments of the inventive concept allow different implementations of the proposed method. In one or more embodiments, the modeling and decision support analytics are implemented as software application executed by one or more computing systems and using reliability data in datastores that can be accessed by these computing systems. The datastores can be data files, databases, data sets transmitted over the network, or other forms of data that can be connected to the computing system that implements the modeling analytics and decision support analytics.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 8 is a table which summarizes reliability SPC rules in accordance with an embodiment of inventive concept.

FIG. 10 is a table which shows an exemplary report on bad parts detected in a fleet using reliability SPC.

FIG. 11 is a table which shows an exemplary report on bad assets detected in a fleet using reliability SPC.

FIG. 12 is a table which shows an exemplary detail report for one of the bad parts detected using reliability SPC.

FIG. 13 is a table which shows an exemplary detail report for one of the bad assets detected using reliability SPC.

DETAILED DESCRIPTION

Figure 1:
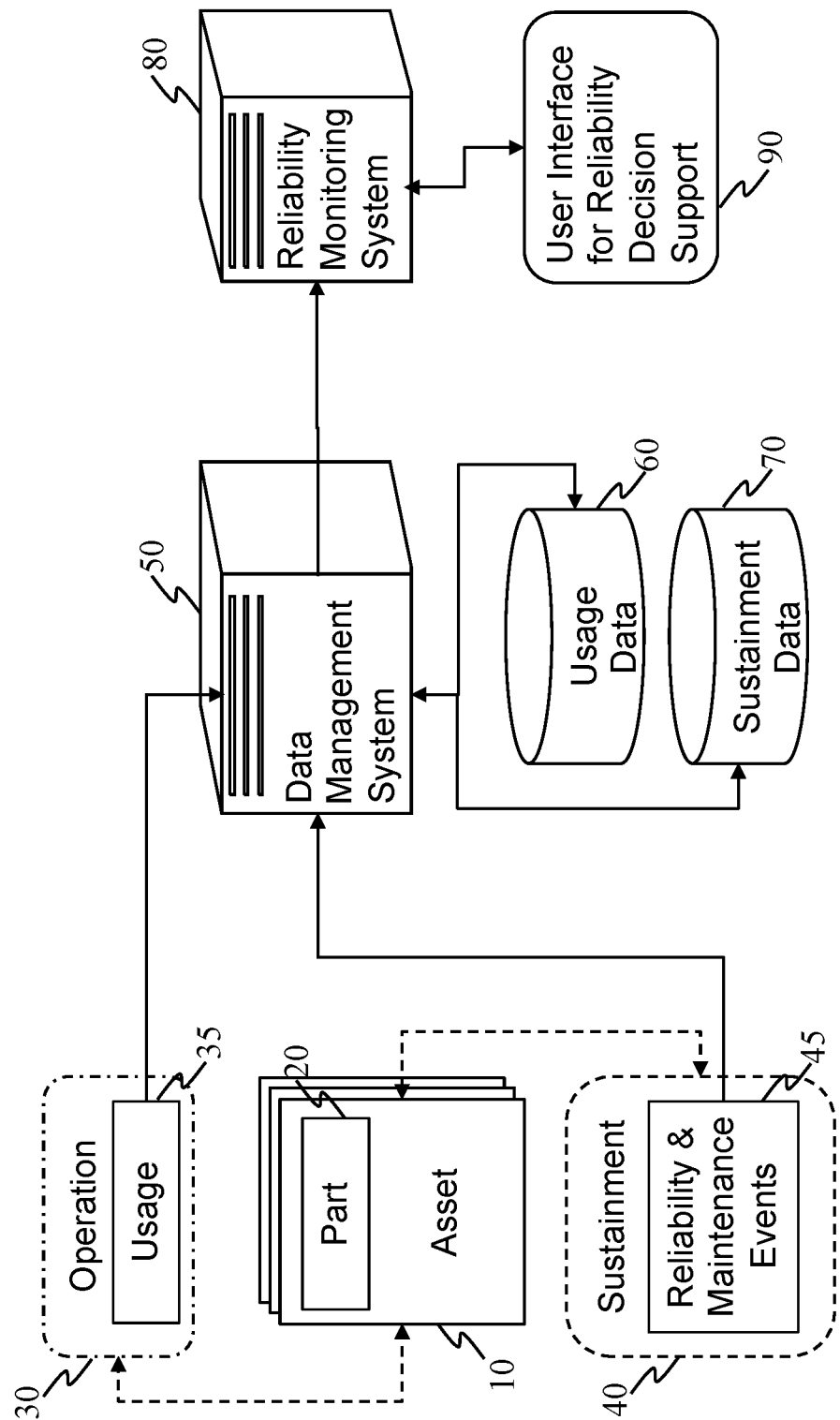
FIG. 1 is a block diagram which illustrates composition of a representative fleet reliability monitoring system implementing the method in accordance with an embodiment of inventive concept.

In the following detailed description, reference will be made to the accompanying drawing(s), in which identical functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on one or several general purpose computers or in the form of combination of software and hardware.

One or more embodiments of the invention address the need to monitor reliability for a plurality of assets of the same type—a fleet of the assets. The examples are aircraft fleet, ground vehicle fleet, power turbine fleet, and other. In the preferred embodiment, each asset includes at least one serviceable part, such as an avionics module in the aircraft. In one or more embodiments of the invention there are many different repairable or non-repairable replaceable parts in each asset and the invention could be used for many different part types.

This invention disclosure primarily discusses two indenture levels, where indenture level is a designation of an item's relative complexity as an assembly or function; asset has a higher indenture level and part is at lower indenture level. Various embodiments of the invention can relate to such items as vehicles, assets, systems, system segments, prime items, subsystems, Line Replaceable Units (LRUs), components, assemblies, subassemblies, circuit cards, and parts at a variety of indenture levels. The invention can be applied to items at any two indenture levels where the higher indenture level is designated as asset and the lower indenture level is designated as a part. For somebody knowledgeable in the field, it should be obvious how the applications of the instances of this invention could be combined to apply to complex situations of sustainment of multiple items at multiple indenture levels for the same fleet to provide the benefits of this invention to the fleets of these multiple items.

In one embodiment, the asset fleet is supported by the maintenance and repair operation (MRO). In the MRO, a part in the asset can be removed from the asset and replaced by other part of the same type to allow for continuing asset operation. Sometimes a good, operational, part might be removed for testing, for cannibalization (use on another asset), or some other reason. In the repair operation, the failed part removed from the asset can be repaired and installed to the same or another asset.

In the preferred embodiment, each asset has a unique asset serial number and each part has a unique part serial number collected as a part of the reliability data. The reliability data collected in the MRO includes reliability events data comprising data on part installations and removals for the fleet and information on whether the part removal was caused by a failure or some other reason. The reliability data further includes data on part usage between the install and removal of the parts or between the install and given time collected in the asset operation.

In one embodiment, usages of the parts are derived from the data on the usage of the assets were the parts are installed. In various embodiments of the invention, the usage data might take one several alternative forms exemplified by but not limited to the time since installation and before removal, time of active operation such as flight hours for an aircraft, number of operation cycles such as engine starts, number of asset missions, cumulative count of usage intensity. In one embodiment the usage of the part that was removed and installed again counts the cumulative usage through the earlier installation periods after the earlier substantial repair or overhaul of the part.

In alternative embodiments, part serial number data can be derived from other available data for each reliability event and each usage record. As one example, the part serial number can be cross-referenced to another computer record for the same job control number.

In the preferred embodiment, the reliability data including the described reliability event data from MRO and the usage data are collected for the fleet of the assets over a period of time. The collected reliability data are stored in one or several reliability datastores where they are available for computer processing.

In the preferred embodiment, the fleet reliability monitoring is implemented as computer processing of the reliability data stored in the reliability datastores. The data processed in reliability monitoring includes the data on failures, removals, part installations, and other sustainment events for assets and parts in the fleet and the data on usage of the assets.

In the preferred embodiment, the fleet reliability monitoring system addresses at least two important and distinct problems that are described next. The first problem is finding a modeling approach that computes reliability models based on historical data, which might contain some bad actor data. The second problem is developing decision logic for prompt and reliable detection from new available data, where the detection of bad actors is based on the reliability models.

In the preferred embodiment, the solution of the modeling problem is based on the view that fleet mostly consists of normal parts and assets with minority of the parts and minority of assets possibly being bad actors with diminished reliability and behaving abnormally. An exemplary data driven solution based on this view is described next.

In one embodiment, the reliability model is estimated directly from the data without making any assumptions about distribution and using nonparametric probability distribution model. This is allows avoiding case-specific analysis of statistical model assumptions and makes the data driven method fully automated. One skilled in the art would recognize that using nonparametric model makes it easier to have accurate and statistically consistent analysis of the reliability data that is partially censored. The censored data correspond to reliability events where the part was removed not because it failed, but for some other reason. In practice, censored data might make a substantial fraction of MRO data sets.

In one or more embodiments, the first step in applying the method is estimating a model of probability distribution that describes reliability of normal parts. In one embodiment, the probability distribution model is determined directly from the past historical reliability and usage data by Bayesian estimation of nodal values in the profile of the probability density for the distribution. The Bayesian estimation method works by fitting the probability distribution model to the collected reliability event data with help of numerical optimization; the optimized index is the posterior likelihood of the observed reliability events, where posterior likelihood is computed in accordance with the assumed probability distribution model.

In another embodiment, the cumulative distribution function model is determined directly from the historical reliability and usage data by using Kaplan-Meier survival analysis method. Alternative embodiments can use other mathematical methods for determining nonparametric or parametric model of survival function, cumulative probability function, probability density, or other probability models that allows deriving a usable representation of the cumulative probability density function.

One or more embodiments of inventive concept allow performing the reliability model estimation by performing several iterations of the computations. At each iteration, the data for bad actor parts and bad actor assets are removed from the data fitting computations. In one or many embodiments, the iterations proceed as follows. Initially it assumed that the set of the bad actors is empty. After the reliability model is estimated, it is used to set up the SPC rules as discussed below in this invention description. The SPC rules are applied to detect bad actors and add them to the bad actor set. The data for the bad actors are then removed from the data fitting in the model estimation and the next iteration is performed. The iterations continue till they converge to a final set of the bad actors and the final model, which is subsequently used. Such iterative estimation can significantly improve the accuracy of the method.

In the preferred embodiment, the reliability model is estimated in the form of cumulative probability density function that can be represented as $F(x)=P(u \leq x)$, where $P(.)$ denotes a probability of a random event, u is the usage variable, and x is the usage value before the failure.

In the preferred embodiment, the decision logic relies on the computed reliability model to discriminate rigorously and automatically between the normal and the anomalous reliability data. The decision logic is designed in such way that the anomalous reliability data is detected promptly after it is obtained; this design requirements follows from the need to confirm an anomaly with possibly little wait for additional datapoints such that action of correcting the anomaly can proceed promptly.

In the preferred embodiment, the decision logic is based on the reliability Statistical Process Control (SPC) algorithms. The algorithms determine bad actors including bad actor assets and bad actor parts by applying reliability SPC rules to the consecutive usages between the part installations and part failure. The decision logic is fully automated and can process large reliability datasets collected in MRO of large fleet of assets over long time periods.

In one or more embodiments, the SPC decision logic is applied to one or several recent consecutive usage intervals before part failure; each usage interval starts with part installation and ends with subsequent part removal after a period of usage. In one embodiment, the said usage intervals are consecutive for usage of a particular part, which might be moved from one asset to another between the intervals; the SPC decision logic is used to identify bad actor parts. In alternative embodiment, the said usage intervals are consecutive for usage of a particular asset, which might have parts removed and replaced between the intervals; the SPC decision logic is used to identify bad actor assets.

In the preferred embodiment, the reliability SPC rules in the decision logic are established by comparing the described part usages on the usage intervals preceding part failures against SPC reliability rule thresholds, wherein the thresholds are computed based on fleet reliability model described above.

In the preferred embodiment, the reliability SPC rules for monitoring the reliability data for the fleet of assets include at least two of the following rules.

The first rule is that the usage interval before failure is less than the first threshold The second rule is that the two consecutive usage intervals before failure are both less than the second threshold The third rule is that the three consecutive usage intervals before failure are all less than the third threshold The fourth rule is that at least four out of five consecutive usage intervals before failure are all less than the third threshold In the preferred embodiment, the abovementioned reliability SPC rule thresholds are computed based on fleet reliability model described above. In one or more embodiments, the thresholds are computed in accordance with the False Positive/False Negative (FP/FN) tradeoff as defined by the FP probability, $p_{FP}$.

In the preferred embodiment, the thresholds in the SPC rules are established using the Cumulative Density Function (CDF) for the estimated fleet reliability model, $F(x)=P(u \leq x)$.

In an exemplary embodiment, the first threshold $A_1$, second threshold $A_2$, and third threshold $A_3$ in the reliability SPC rules are computed to provide FP probability $p_{FP}$ that does not exceed 0.01; in this exemplary embodiment the thresholds are selected as follows For the first reliability SPC rule that evaluates a single usage interval, the first threshold $A_1$ is set such that $p_1=P(u \leq A_1)=0.01$. This provides $p_{FP}=p_1=0.01$ for the probability of failure in accordance with the CDF for the estimated fleet reliability model.

For the second reliability SPC rule that evaluates two consecutive usage intervals, the second threshold $A_2$ is set such that $p_2=P(u \leq A_2)=0.1$. This provides $p_{FP}=(p_2)^2=0.01$ as the probability that each of the two consecutive usage intervals is smaller than an interval with probability $p_2$.

For the third reliability SPC rule that evaluates three consecutive usage intervals, the third threshold $A_3$ is set such that $p_3=P(u \leq A_3)=0.2154$. This provides $p_{FP}=(p_3)^3=0.01$ as the probability that each of the three consecutive usage intervals is smaller than an interval with probability $p_3$.

For the fourth reliability SPC rule, which evaluates five consecutive usage intervals, the threshold is set the same as the third threshold $A_3$, such that $p_3=P(u \leq A_3)=0.2154$. Assuming the usage intervals till the failure are independent, the probability that 4 out of 5 in-distribution samples exceed threshold is $p_{FP}=5(1-p_3)(p_3)^4<0.0084<0.01$ as the probability that 4 out of 5 consecutive usage intervals are smaller than an interval with probability $p_3$ and the fifth interval is larger than an interval with probability $p_3$.

Decision support information comprises the set of bad actors is defined by the reliability SPC rules that have fired, which means there is the defined number of usage data points or more above the rule threshold. In one embodiment, the decision support analytics computes decision support information based on reliability data and usage data limited to a given period in time, such as the last several data points for usages between the part failures. In another embodiment, the SPC rules are applied to the moving window of several data points for the usages between consecutive failures of a given part. In alternative embodiment, the SPC rules are applied to the moving window of several data points for the usages between consecutive part failures for a given asset.

Some aspects of the abovementioned important problem features have been disclosed in the prior art. For example, the importance of improving sustainment processes for asset fleets by means of collection and computational processing of the maintenance data has been recognized in the prior art. For example, the U.S. Pat. Nos. 8,019,504 and 8,751,421 describe different systems that collect the data on failures and repairs for fleets of parts and assets in a central database. This data is subsequently extracted from the database and processed by computing systems to achieve a desirable outcome.

U.S. Pat. No. 8,019,504, incorporated herein by reference, teaches the use of reliability data, along with other data to identify the set of trends related to calculated metrics affecting the fleet of selected aircraft. Each part is rated as stable, improving, or degrading. U.S. Pat. No. 8,019,504, teaches data analysis for individual parts that relies on variety of data sources including reliability data; it does not describe how to perform the analysis if reliability data is the only data available.

U.S. Pat. No. 7,860,618, incorporated herein by reference, formulates the goal of identifying the worst assets (bad actors) in the asset fleet (where the assets are the aircraft). U.S. Pat. No. 7,860,618 teaches Weibull distribution parametric model depending on the usage (Flight Hours). This fleet-wide reliability model is used to estimate the risk of failure of individual asset and part depending on the usage so far. This prior art describes usage-based reliability model, but does not teach bad actor detection.

U.S. Pat. No. 6,691,064 incorporated herein by reference, teaches monitoring of reliability data from reliability database, the same type of data as in this disclosure. This prior art is closest to the subject invention and includes an interim goal of finding the bad actors, which is the same as one of the goals of this invention. The prior art approach disclosed in U.S. Pat. No. 6,691,064 is based on counting the number of failures within a given counting time interval. This prior art approach is insufficiently accurate. As one example, count of one failure does not preclude long times between failures before and after the counted failure and thus tells nothing about the reliability. The count of two failures means one time interval between the two failures is less than the observation interval, which provides minimal information that can be related to reliability but is not very precistae. The accuracy of such method is low if the counting time interval is small, because there will be just one or two failures in the interval. If, on another hand, the counting interval is large, then there is potentially a large delay after a bad actor appears and before some action rectifying that can be taken based on the failure count.

This invention addresses the described drawbacks by formulating and applying the reliability SPC rules. Several SPC rules have been used in the industry for some time; such rules have been disclosed in prior art inventions for process data other than reliability data. As one example, U.S. Pat. No. 6,424,876 incorporated herein by reference, teaches one of the version of the SPC based on Western Electric Rules, which provide well known SPC approach. In U.S. Pat. No. 6,424,876, the Western Electric Rules are applied to preprocessed performance data collected from number of processes and assets. These control charts and Western Electric Rules for the SPC are based on normal distribution assumption. These SPC rules count points exceeding thresholds that are based on the mean and standard deviation statistics, which describe the normal distribution; these rules are not applicable to the reliability data, which are described by the distribution other than the normal.

The existing SPC control charts and SPC rules are suitable and accurate for Gaussian process monitoring where the data follows normal distribution. However, existing SPC rules cannot be properly used for reliability data monitoring because the reliability (failure) data follow strongly non-gaussian statistics. The simplest model used in the domain of the reliability is known as Mean Time Between Failures (MTBF) model. Even this simplest MTBF model implies exponential distribution of the failure time interval lengths; the exponential distribution is very different from the normal.

Various embodiments of the inventive concept relate to method for estimating the CDF of the reliability distribution from the reliability data describing cumulative usages before the part failures. One knowledgeable in the art can obtain the CDF by estimating hazard function. The methods and models for estimating the hazard function from the reliability data are known in the prior art, though these methods have not been used for the purposes of the reliability SPC described in this invention. As one example of such prior art, the paper by L. H. Crow (2011) and references thereof describe one established method for computing the reliability hazard function (instantaneous failure rate) assuming a simple two-parameter model for the hazard function where time serves in place of the usage.

Various embodiments of the inventive concept relate to a method for monitoring reliability for a fleet of assets; the method can be implemented as a part of dedicated monitoring system or as a software program product. The proposed monitoring method is preferably implemented as software in a computer system and can be adapted to work with different types of applications (such as, for example, different asset types, monitored data, monitored behaviors, and systems) by changing data processing steps of the method, models used in the method, computing system configuration, and other configurable parts of the method. The embodiments described below include examples of the assets and parts for which this method can be implemented by the way of example only; the method is not limited to these example assets and parts.

FIG. 1 illustrates an embodiment of a representative fleet reliability monitoring system implementing the inventive concept. The block diagram in FIG. 1 provides an overview of the system and its operating environment in accordance with an embodiment of the inventive concept.

In one or more embodiments, the monitored fleet consists of plurality of Assets 10. Each asset includes Part 20 that can be removed replaced and repaired. This invention is not limited to a given number of removable and replaceable parts in the asset, there should be at least one part, and there could be many parts, each in turn consisting of many parts, and so on through multiple indenture levels.

Assets 10 can be any engineering systems, aircraft, propulsion systems, power generating equipment, power transmission and distribution equipment, engines, vehicles, automotive systems, aerospace systems, marine systems, machines, devices, electrical power systems, semiconductor manufacturing tools, HVAC equipment, computer networks, electronic equipment, laboratory equipment, computer systems, navigation systems, communication equipment, cell phones, etc. The proposed invention is applicable to different types of assets including but not limited to the described systems.

In one or more embodiments, the assets are involved in two distinct business processes. One business process is Operation 30, where the asset provides a useful business function. Another business process is Sustainment 40, where the assets are maintained by removing and replacing parts. The sustainment process might further include part and asset testing and repairs. In some embodiments, the assets that involved in the sustainment process are excluded from the operations.

The operations process includes collection of the Usage data 35 for the operating assets and/or parts in these assets. In some embodiments Usage data can be collected automatically; in other embodiments Usage data can be collected manually and then entered into computer system.

Sustainment includes collection of the Reliability and Maintenance Events data 45. These data typically include part removal and installation times, job control number, serial numbers of parts removed and installed, serial number of asset, and the reason why the part was removed (e.g., replacement because of the failure, need to test the part, cannibalization for part use on another asset, or other). In some embodiments Reliability and Maintenance Events data can be collected automatically; in other embodiments, Reliability and Maintenance Events data can be manually entered into computer system.

In the preferred embodiment, Data Management System 50 aggregates and manages the data on usage 35 collected in the asset operations as well the data on reliability and maintenance events 45 collected in the sustainment activities. In one or more embodiments these data are stored in Usage Data 60 datastore and in Sustainment Data 70 datastore. In one or more embodiments, the data are stored separately in different datastores because they belong to different enterprises or different organizational entities within the same enterprise that are responsible for operations and sustainment respectively. The datastores could include but are not limited to disk drives, tape storage, flash drives, integrated database management systems, optical disks, and other.

In one or more embodiments, the reliability data including Usage Data 60 and Sustainment Data 70 are analyzed by Reliability Monitoring System 80 that hosts analytical functions. The Reliability Monitoring System provides User Interface for Reliability Decision Support 90 that presents results of the analytical processing of the reliability data to the user in support of informed and optimized decisions on the sustainment operations, retirement of assets or parts, maintenance work scheduling, logistics of the spare parts, and other value added decisions.

The functions of the Reliability Monitoring System are different from the functions of Data Management System. In various embodiments, these two systems could be implemented as separate systems, different computational functions within the same system, or different virtual machines on the same cloud computing systems.

The Data Management System, the Reliability Monitoring System, and the datastores could be implemented as a single processor, PC desktop or laptop computer, computer workstation, multiprocessor server computer, mainframe computer, a computer cluster, virtual machines, computing tasks in cloud computing environment, or with any other appropriate computing technology.

Figure 2:
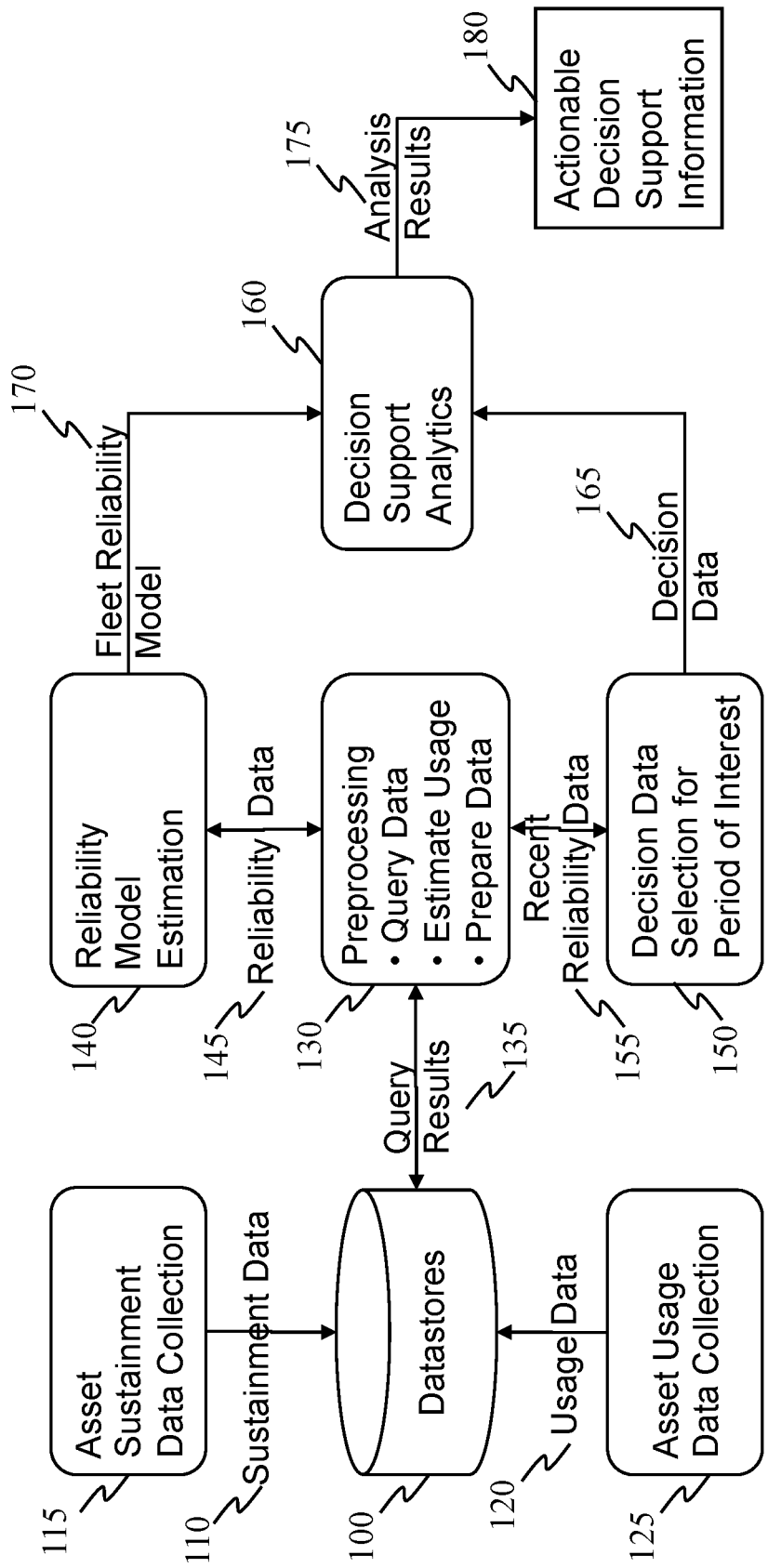
FIG. 2 is a block diagram which depicts functional decomposition of the data analysis in accordance with an embodiment of inventive concept.

FIG. 2 is a block diagram which depicts functional decomposition of the data analysis in accordance with an embodiment of inventive concept.

In the preferred embodiment, Datastores 100 contain Sustainment Data 110 obtained by the Asset Sustainment Data Collection function 115 as well as Usage Data 120 obtained by the Asset Usage Data Collection function 125. In one or many embodiments, Datastores 100 could be implemented as databases. The analytical data processing in accordance with the method presented in this invention starts from Preprocessing step 130. The preprocessing function queries Datastores 100 and obtains Query Results 135 with reliability data including the usage data and reliability event data.

In the preferred embodiment, Preprocessing function 130 estimates usage of each part between reliability events such as its installation on an asset and removal from the asset; the preprocessing further evaluates the history of the part removals to discriminate between unforced removals, where the part is installed back into the same or another asset and continues operating without major repairs, and removals of failed parts, where the part undergoes major repair or is retired. The preprocessing function prepares the reliability data comprising the reliability event and usage data in the aggregated form suitable for subsequent analytical processing.

The data preparation in the preprocessing includes data cleanup, which is needed for fixing inconsistent data records such as inconsistent usage data records or inconsistent install/removal data records. As one example, the data records might show that the part is installed on an asset before the previously installed part is removed, which would seem to indicate that two parts are installed on the asset instead of one. As another example, the records might incorrectly show that the part might be installed and used simultaneously on two assets. Such inconsistent data need to be cleaned up, modified, or removed, in order for subsequent analytical data processing to be accurate.

In one or more embodiments, Reliability Model Estimation 140 uses Reliability Data 145 that was prepared as result of Preprocessing 130. This data describe fleet sustainment operation over long period of time to allow for sufficient statistical averaging in the model estimation.

In one embodiment, the functionality of Preprocessing 130 is also used to obtain Decision Support Data 175 that covers the recent period of the fleet operation and that needs to be evaluated to make decisions about current fleet sustainment operation. Decision Support Analytics 160 computes Analysis Results 175 based on the Decision Support Data 175. These results are used to provide Actionable Decision Support Information 180 that provides value added decisions.

In one or other embodiment, Analysis Results 175 describe the reliability of the parts or firing of the reliability SPC rules that detect 'Bad Actors' parts or 'Bad Actors' aircraft hosting the parts. Examples of Actionable Decision Support Information relying on such Analysis Results include suggestions to retire the 'Bad Actors' parts or suggestions to repair the aircraft deemed to be 'Bad Actors' when hosting the parts.

The algorithmic logic in Decision Support Analytics 160 is based on the estimated Fleet Reliability Model 170 in the form of the Hazard Function for the failure depending on the usage or, equivalently, the CDF for the failure depending on the usage.

Figure 3:
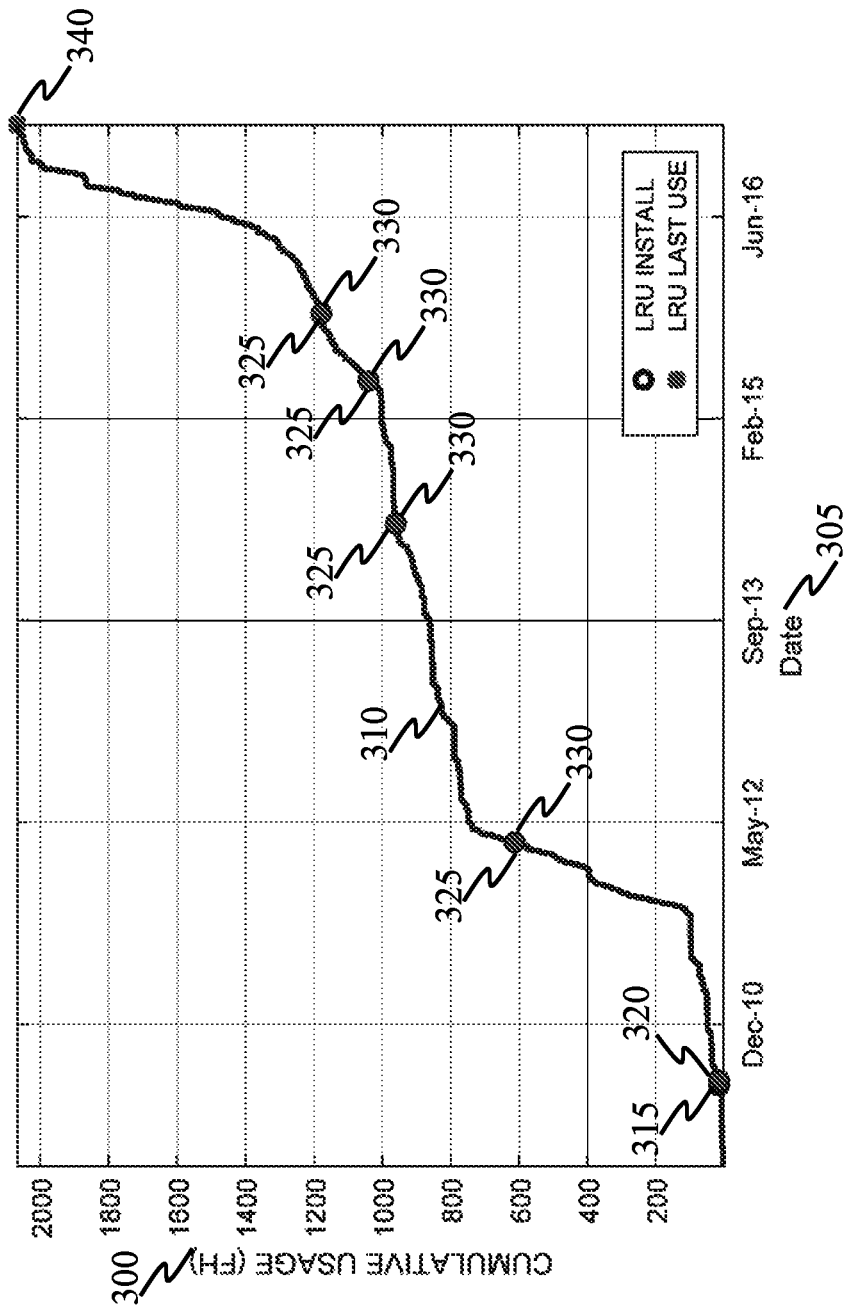
FIG. 3 is a chart which shows exemplary plot for asset usage against time and illustrates usage estimation for a part for an embodiment of this invention.

FIG. 3 is a chart that shows exemplary plot for asset usage against time and illustrates usage estimation for a part for an embodiment of this invention. The chart plots Cumulative Usage of an asset (aircraft) measured in flight hours (FH) 305 against the calendar date 305. The plot is a continuous curve 310. Markers 325 in the plot show the installation of a part (LRU) on curve 310; markers 330 show the removal of the part (LRU). Marker 315 shows the installation of the part that the data say occured prior to removal of the part previously installed on the aircraft; this is inaccurate data record, which is corrected in the data cleanup process.

Marker 340 shows the last available record of the part being used on the asset; this is a censored record that comes in the end of the available data. In the preferred embodiment, part usages between install and remove times are determined as the differences between the cumulative asset usage at these times. Such part usage estimation method is based on the assumption that the part is used whenever the asset is used and their usage accumulates simultaneously.

Figure 4:
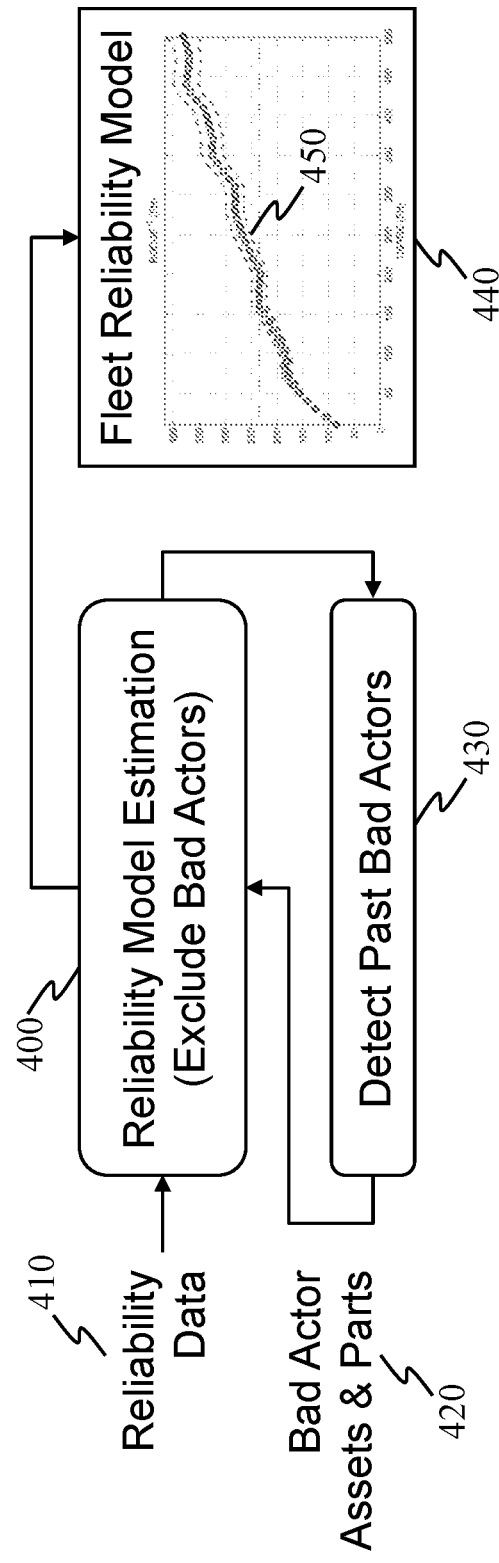
FIG. 4 is a block diagram which illustrates the reliability model estimation logic for an embodiment of this invention.

FIG. 4 is a block diagram which illustrates the reliability model estimation logic for an embodiment of this invention. Reliability Model Estimation 400 is based on historical Reliability Data 410 collected from the fleet of assets and parts over a period of time. In one or many embodiments, the Reliability Model Estimation detects Bad Actor Parts and Assets 420 that have data substantially deviating from the estimated reliability model. These Bad Actors are excluded from the model estimation in an iterative process, where the steps of Reliability Model Estimation 400 and Detect Past Bad Actors 430 are repeated and the detected Bad Actors are excluded from the model estimation at the next iteration. After several iterations, the set of the detected Bad Actors stops changing and the model estimation process converges to produce Fleet Reliability Mode 440. In one or many embodiments, the fleet reliability model comes in the form of a hazard function h(u) 450 that describes the probability of the part failing through an increment of usage depending on the accumulated usage u of the part.

Figure 5:
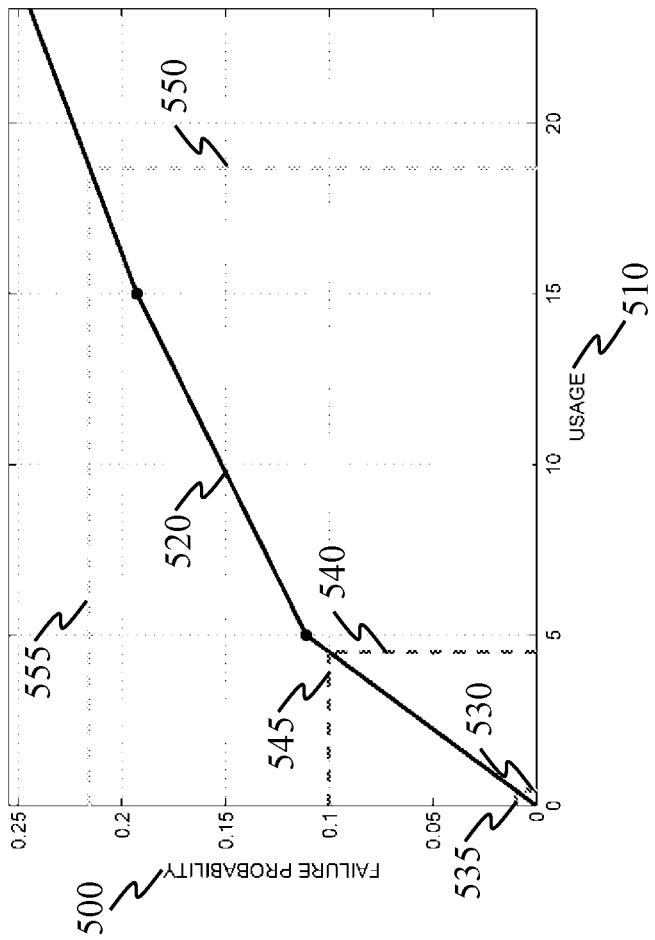
FIG. 5 illustrates selection of the thresholds for the reliability SPC.

FIG. 5 illustrates selection of the thresholds for the reliability SPC rules. FIG. 5 is a chart that shows exemplary cumulative probability density function (CDF) estimated from the data. In one or many embodiments, the CDF F(u) can be estimated from the hazard function h(u) by first computing the cumulative hazard function and then exponentiating $F(u)=\exp[-\int^u h(v)dv]$. The chart shows part Failure Probability 500 plotted against Usage u 510 as the CDF curve F(u) 520. The exemplary embodiment of FIG. 5, is based on sampled approximation of hazard function h(u) that is estimated from the reliability data as described above. The cumulative hazard function obtained by integration of the piece-wise constant hazard function is piece-wise linear, which is why FIG. 5 chart shows a piece-wise linear approximation of the CDF curve F(u) 520.

In the exemplary embodiment of FIG. 5, the thresholds for the reliability SPC rules are selected as follows. The first reliability SPC rule threshold $A_1$ 530 is set to provide the desired Failure Probability 535 to be $p_1=F(A_1)=0.01$. The second reliability SPC threshold $A_2$ 540 is set to provide the desired Failure Probability 545 to be $p_2=F(A_2)=0.1$. The third reliability SPC rule threshold $A_3$ 550 is set to provide the desired Failure Probability 555 to be $p_3=F(A_3)=0.2154$.

Figure 6:
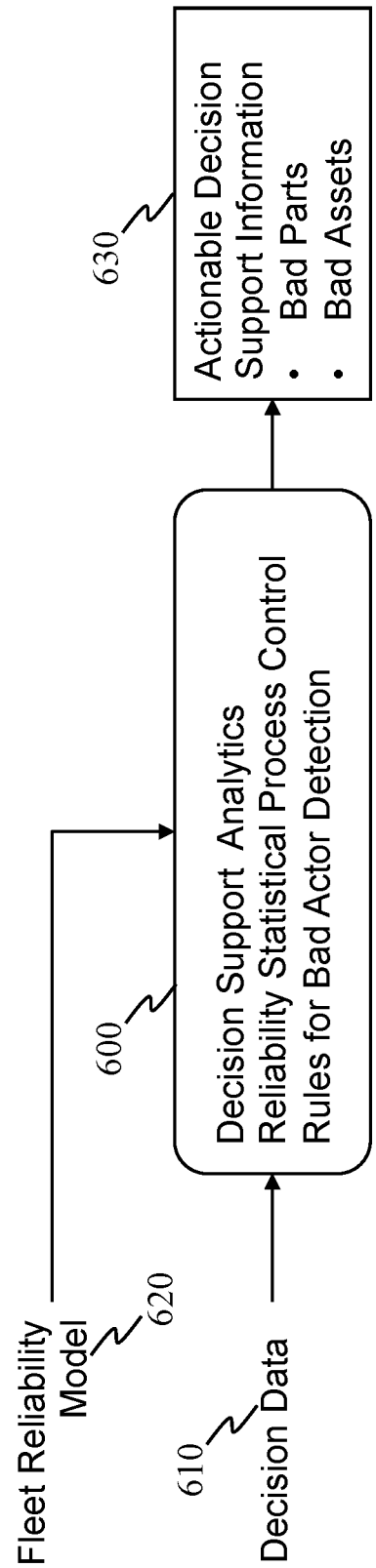
FIG. 6 is a block diagram which illustrates the decision support analytics logic for an embodiment of this invention.

FIG. 6 is a block diagram which illustrates the decision support analytics logic for an embodiment of this invention. Decision Support Analytics 600 implements the Reliability SPC Rules for detection of Bad Actor parts and assets based on the reliability SPC rule thresholds $A_1$, $A_2$, and $A_3$ using Fleet reliability Model 620. In the exemplary embodiment of FIG. 6 these Reliability SPC Rules are applied to the Decision Data 610 to provide Actionable Decision Support Information 630 in the form of lists of Bad Parts (Bad Actor parts) and Bad Assets (Bad Actor assets).

Figure 7:
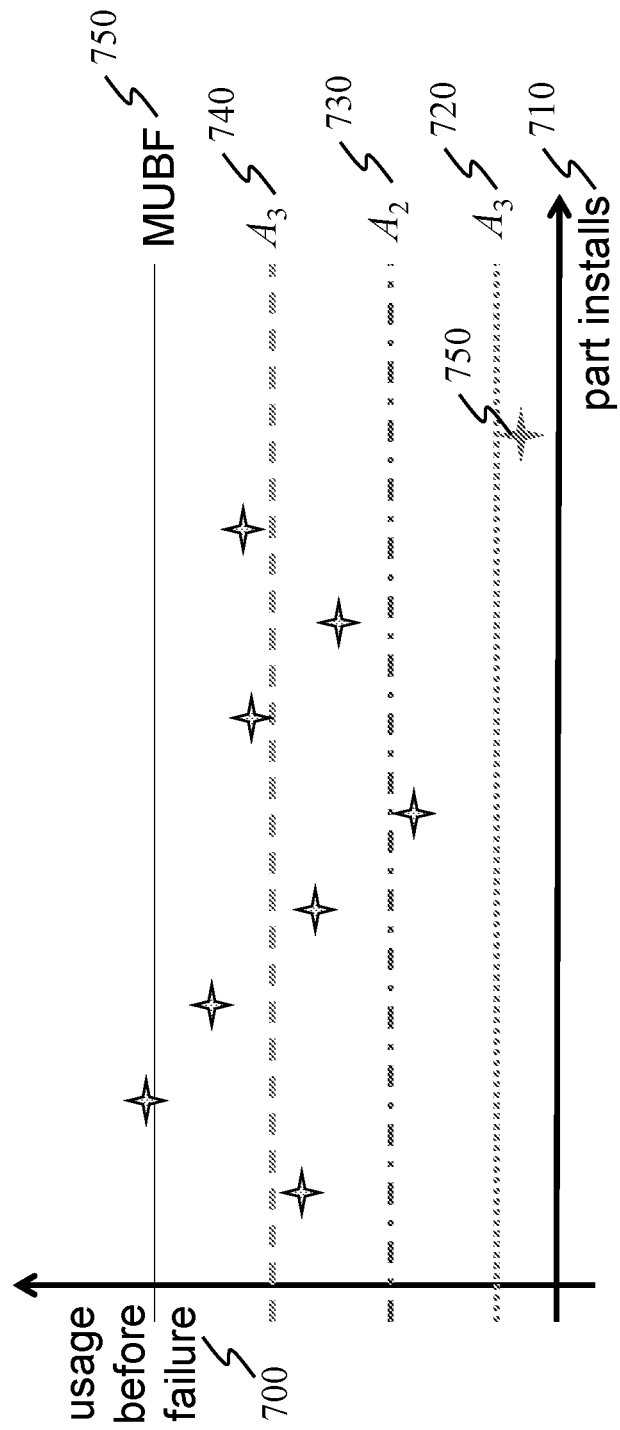
FIG. 7 is an exemplary reliability SPC chart which shows data points and thresholds for four SPC reliability rules plotted against part install count.

FIG. 7 is an exemplary Reliability SPC chart which shows data points and Reliability SPC rule thresholds for the four Reliability SPC Rules plotted against the part install count. In one embodiment, the data points illustrated in the chart show the usage before failure 700 versus the number of sequential installation of a given part; the assets where the part is installed are potentially different each time. In another embodiment, the data points illustrated in the chart in FIG. 7 show the usage before failure 700 versus the number of sequential installation of (potentially different) parts on a given asset. The horizontal lines in the charts show the first reliability SPC rule threshold $A_1$, the second reliability SPC rule threshold $A_2$, and the third reliability SPC rule threshold $A_3$. Additionally the chart shows Mean Usage Before Failure 750, which somebody knowledgeable in the art would recognize as a parameter commonly used to describe the reliability of the part and asset fleet. The highlighted point 750 illustrates an early failure of an installed part, which will be recognized as a Bad Actor by the First Reliability SPC rule because the shown usage interval is below threshold $A_1$.

FIG. 8 is a table which summarizes the Reliability SPC Rules in accordance with an exemplary embodiment of inventive concept. The first column 800 of the table shows the number of the rule. The second column 810 of the table shows the threshold used in the rule where $A_1$ is the first threshold, $A_2$ is the second threshold, and $A_3$ is the third threshold. The third column 820 of the table shows the formulation of the respective Reliability SPC Rule in terms of number of observed samples with respect to the thresholds that make the rule fire.

Figure 9:
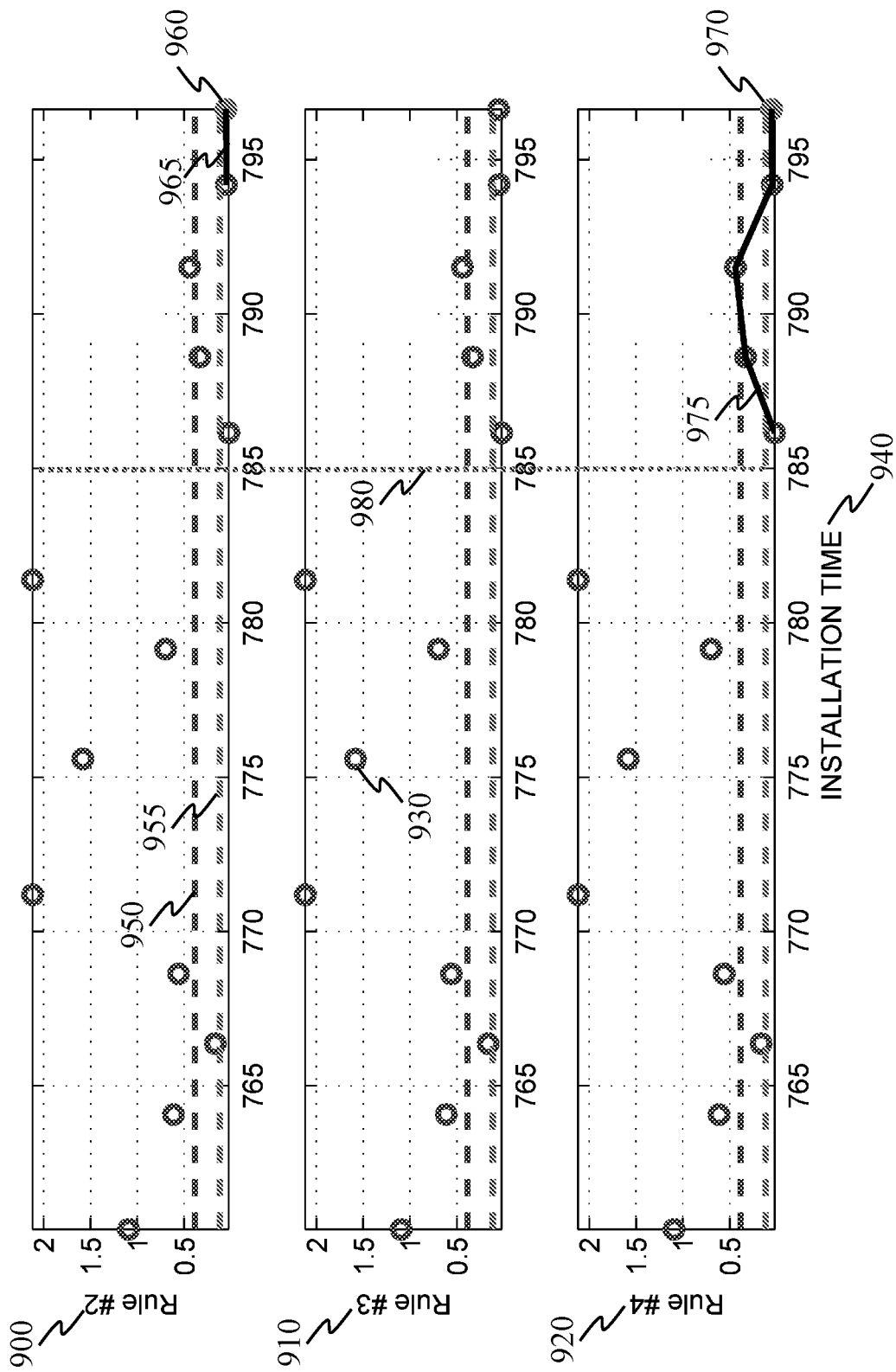
FIG. 9 is a chart which shows exemplary control chart plots for three Reliability SPC rules for simulated data with sudden on-set of accelerated aging

FIG. 9 is a chart which shows exemplary control chart plots for three Reliability SPC Rules for simulated data with sudden on-set of accelerated aging.

The middle plot shows simulated usage for Third Reliability SPC Rule 910 versus simulated installation time 940. Circular markers 930 show the data points for usages till failure for each installation time. The Third Reliability SPC Rule does not fire (is not triggered) by the data shown.

The top plot shows simulated usage for Second Reliability SPC Rule 900 versus simulated installation time 940. The horizontal dashed lines show the third threshold 950 and the second threshold 955. The vertical dotted line 980 across the three sub-plots shows the time when the accelerated aging starts in the simulation; at that time the simulated part becomes a Bad Actor. Line 965 connects two consecutive points below the second threshold, which triggers firing of the Second Reliability SPC Rule. The filled circular marker 960 highlights the last data point and shows the time when the firing of the Second Reliability SPC Rule occurs and the Bad Actor is detected.

The bottom plot shows simulated usage for Third Reliability SPC Rule 920 versus simulated installation time 940. Line 975 connects last five consecutive points; four of these five points are below the first threshold, which triggers firing of the Fourth Reliability SPC Rule. The filled circular marker 970 highlights the last of these five data points and shows the time when the firing of the Fourth Reliability SPC Rule occurs and the Bad Actor is detected.

FIG. 10 is a table which shows an exemplary report on bad parts detected in a fleet using Reliability SPC. The first column 1000 of the table shows the serial numbers of the detected Bad Actor parts. The second column 1010 of the table shows the date when the part was last installed on the asset according to the records. The third column 1020 of the table shows the numbers of the Reliability SPC Rules that fired (were triggered) as the reason to identify this part as a Bad Actor. The third column 1030 shows the Badness index that describes the severity of the observed abnormally bad reliability of the part. In one embodiment, the Badness is computed as the negative log-posterior in the Bayesian decision model.

FIG. 11 is a table which shows an exemplary report on bad assets detected in a fleet using Reliability SPC. The first column 1100 of the table shows the serial numbers of the detected Bad Actor assets. The second column 1110 of the table shows the date when a part was last installed on the asset according to the records. The third column 1120 of the table shows the numbers of the Reliability SPC Rules that fired (were triggered) as the reason to identify this asset as a Bad Actor. The third column 1130 shows the Badness index that describes the severity of the observed abnormally bad reliability of the asset.

FIG. 12 is a table which shows an exemplary detail report for one of the bad parts detected using Reliability SPC. The first column 1200 of the table shows the serial number of the detected Bad Actor part. The second column 1210 of the table shows the recent dates when the part was installed on the asset. The third column 1220 of the table shows the part usages between the installation and the failure. The last three usage entries in the third column, 1230, 1240, and 1250 are relatively small and the reason why the Reliability SCP has detected this part as a Bad Actor.

FIG. 13 is a table which shows an exemplary detail report for one of the bad assets detected using Reliability SPC. The first column 1300 of the table shows the serial number of the detected Bad Actor asset. The second column 1310 of the table shows the recent dates when a part was installed on this asset. The third column 1320 of the table shows the asset usages between the part installation and the failure. The last three usage entries in the third column, 1330, 1340, and 1350 are relatively small and the reason why Reliability SCP has detected this asset as a Bad Actor.

Alternate Embodiments

In one or more embodiments described above, the fleet of assets whos reliability is being monitored from maintenance and repair operation (MRO) data is the fleet of the vehicles, such as aircraft, and the parts being replaced and repaired are Line Replaceable Units (LRUs), such as aircraft avionics modules. The alternative embodiments include, without limitation:

1. Monitoring reliability for a fleet of aircraft engines by collecting the engine flight (mission) data from the engine MRO data.

2. Monitoring reliability for a fleet of ground vehicles, such as trucks, buses, or cars by collecting the fleet MRO data.

3. Monitoring fleet reliability in service and sustainment operation for fleet of semiconductor manufacturing tools deployed at different fabrication plants (fabs). A semiconductor manufacturing tool is an apparatus for implementing a stage of the semiconductor device manufacturing.

4. Monitoring fleet reliability in service and sustainment operation for electric power generation equipment such as a fleet of power turbines or a fleet of wind power generators.

5. Monitoring fleet reliability in service and sustainment operation or electrical grid equipment such as a fleet of transformers or a fleet of circuit breakers.

6. Monitoring fleet reliability in service and sustainment operation for oil and gas equipment such as a fleet of pumps or a fleet of valves.

7. Monitoring fleet reliability in service and sustainment operation for industrial process plants, such as refineries or pulp and paper plants.

8. Monitoring fleet reliability in service and sustainment operation for manufacturing plants.

9. Monitoring reliability for a fleet of medical devices, such as MRI machines, by collecting the fleet MRO data.

10. Monitoring reliability for a fleet of office equipment, such as copiers or printers, by collecting the fleet MRO data.

Each of the alternative embodiments would have different set of replaceable parts at different levels of indenture, use a different set of the part repair and replacement practices, and have asset and part usage monitored and calculated in different ways. The overall system design and method for the fleet reliability monitoring are as described in this disclosure.

Exemplary Computer Platform

Figure 14:
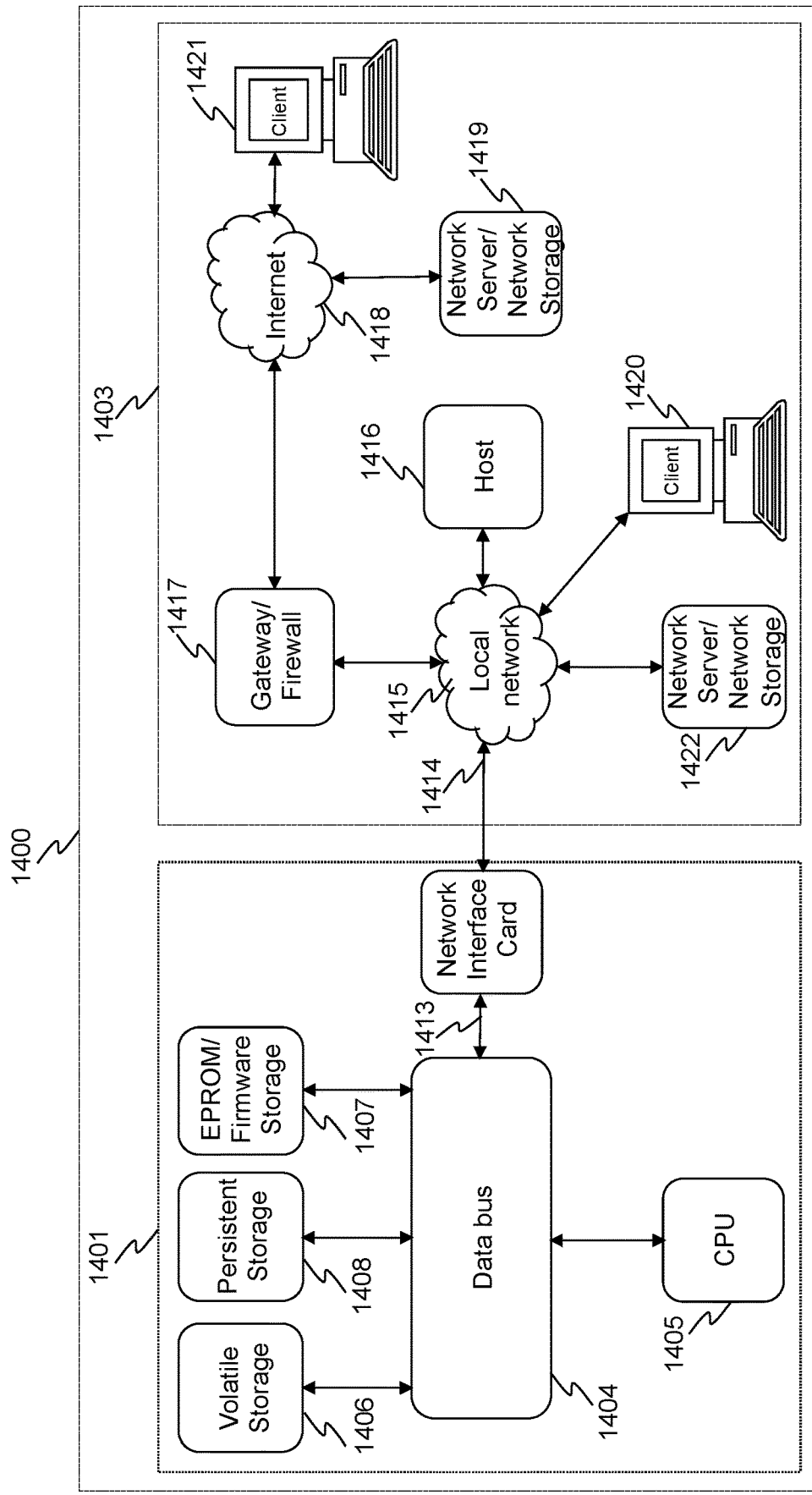
FIG. 14 illustrates an exemplary embodiment of a computer/server system upon which an embodiment of the inventive methodology may be implemented.

FIG. 14 is a block diagram that illustrates an embodiment of a computer/server system 1400 upon which an embodiment of the inventive methodology may be implemented. The system 1400 includes a computer/server platform 1401 and network resources 1403.

The computer platform 1401 may include a data bus 1404 or other communication mechanism for communicating information across and among various parts of the computer platform 1401, and a processor 1405 coupled with bus 1401 for processing information and performing other computational and control tasks. Computer platform 1401 also includes a volatile storage 1406, such as a random access memory (RAM) or other dynamic storage device, coupled to bus 1404 for storing various information as well as instructions to be executed by processor 1405. The volatile storage 1406 also may be used for storing temporary variables or other intermediate information during execution of instructions by processor 1405. Computer platform 1401 may further include a read only memory (ROM or EPROM) 1407 or other static storage device coupled to bus 1404 for storing static information and instructions for processor 1405, such as basic input-output system (BIOS), as well as various system configuration parameters. A persistent storage device 1408, such as a magnetic disk, optical disk, or solid-state flash memory device is provided and coupled to bus 1401 for storing information and instructions.

An external storage device 1412 may be connected to the computer platform 1401 via bus 1404 to provide an extra or removable storage capacity for the computer platform 1401. In an embodiment of the computer system 1400, the external removable storage device 1412 may be used to facilitate exchange of data with other computer systems.

The invention is related to the use of computer system 1400 for implementing the techniques described herein. In an embodiment, the inventive system may reside on one or multiple machines such as computer platform 1401. According to one embodiment of the invention, the techniques described herein are performed by computer system 1400 in response to processor 1405 executing one or more sequences of one or more instructions contained in the volatile memory 1406. Such instructions may be read into volatile memory 1406 from another computer-readable medium, such as persistent storage device 1408. Execution of the sequences of instructions contained in the volatile memory 1406 causes processor 1405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1405 for execution. The computer-readable medium is just one example of a machine-readable medium, which may carry instructions for implementing any of the methods and/or techniques described herein. Such a medium may take many forms, including but not limited to, non-volatile media or volatile media. Non-volatile media includes, for example, optical or magnetic disks, such as storage device 1408. Volatile media includes dynamic memory, such as volatile storage 1406.

Common forms of computer-readable media include, for example, a floppy disk, a flexible disk, hard disk, magnetic tape, or any other magnetic medium, a CD-ROM, any other optical medium, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1405 for execution. For example, the instructions may initially be carried on a magnetic disk from a remote computer. Alternatively, a remote computer can load the instructions into its dynamic memory and use an infra-red transmitter to convert the data to an infra-red signal. An infra-red detector local to computer system 1400 can receive the data carried in the infra-red signal and appropriate circuitry can place the data on the data bus 1404. The bus 1404 carries the data to the volatile storage 1406, from which processor 1405 retrieves and executes the instructions. The instructions received by the volatile memory 1406 may optionally be stored on persistent storage device 1408 either before or after execution by processor 1405. The instructions may also be downloaded into the computer platform 1401 via Internet using a variety of network data communication protocols well known in the art.

The computer platform 1401 also includes a communication interface, such as network interface card 1413 coupled to the data bus 1404. Communication interface 1413 provides a two-way data communication coupling to a network link 1414 that is connected to a local network 1415. For example, communication interface 1413 may be an integrated services digital network (ISDN) card or a modem to provide a data communication connection to a corresponding type of telephone line. As another example, communication interface 1413 may be a local area network interface card (LAN NIC) to provide a data communication connection to a compatible LAN. Wireless links, such as well-known 802.11a, 802.11b, 802.11g, 802.11n, 802.11ac, and Bluetooth may also be used for network implementation. In embedded avionics implementations of the network, one of the standard backplane data buses such as, ARINC 629 or an optical avionics data bus may be used. A TTP data bus may also be used, such as in automotive and aerospace applications. In any such implementation, communication interface 1413 sends and receives electrical, electromagnetic or optical signals that carry digital data streams representing various types of information.

Network link 1413 typically provides data communication through one or more networks to other network resources. For example, network link 1414 may provide a connection through local network 1415 to a host computer 1416, or a network storage/server 1417. Additionally or alternatively, the network link 1413 may connect through gateway/firewall 1417 to the wide-area or global network 1418, such as an Internet. Thus, the computer platform 1401 can access network resources located anywhere on the Internet 1418, such as a remote network storage/server 1419. On the other hand, the computer platform 1401 may also be accessed by clients located anywhere on the local network 1415 and/or the Internet 1418. The network clients 1420 and 921 may themselves be implemented based on the computer platform similar to the platform 1401.

Local network 1415 and the Internet 1418 both use electrical, electromagnetic or optical signals that carry digital data streams. The signals through the various networks and the signals on network link 1414 and through communication interface 1413, which carry the digital data to and from computer platform 1401, are exemplary forms of carrier waves transporting the information.

Computer platform 1401 can send messages and receive data, including program code, through the variety of network(s) including Internet 1418 and local network 1415, network link 1414 and communication interface 1413. In the Internet example, when the system 1401 acts as a network server, it might transmit a requested code or data for an application program running on client(s) 1420 and/or 1421 through Internet 1418, gateway/firewall 1417, local network 1415 and communication interface 1413. Similarly, it may receive code from other network resources.

The received code may be executed by processor 1405 as it is received, and/or stored in persistent or volatile storage devices 1408 and 1406, respectively, or other non-volatile storage for later execution. In this manner, computer system 1401 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, VHDL, C/C++, C#, SQL, Java, Matlab, R, Labview, python, perl, ruby, scala, shell scripts, etc.

Moreover, other implementations of the invention will be apparent to those skilled in the art from consideration of the specification and practice of the invention disclosed herein. Various aspects and/or components of the described embodiments may be used singly or in any combination in the inventive reliability monitoring system. It is intended that the specification and examples be considered as exemplary only, with a true scope and spirit of the invention being indicated by the following claims.

What is claimed is:

1. A method for monitoring of reliability data for a plurality of assets and plurality of parts, each asset is associated with a unique asset serial number and comprises at least one part, wherein the at least one part in the each asset is associated with a unique part serial number, failed parts are replaced other parts of the plurality of parts of the same type, at least two of the failed parts are removed from the asset, repaired, and installed to the same or another asset of the plurality of assets, the assets are sustained over a period of time wherein sustainment process comprises repairs and replacements of failed asset parts to support continuing asset operation after the sustainment, the method comprising:

a. collecting reliability data for the sustainment of the plurality of assets and the plurality of parts over a period of time and storing the collected reliability data in one or more reliability datastores, wherein the collected reliability data comprises:

i. reliability event data comprising data on part installations and removals for the plurality of assets and information on whether part removal was caused by a part failure or other reason;

ii. part usage data comprising data on usage of part or asset in the operation on the interval between the install and removal of the part or on the interval between the part install and given time; and iii. part or asset serial number data or equivalent data for each reliability event; and b. modeling analytics function and decision support analytics function, the modeling analytics function computes a reliability model describing failure probabilities for the plurality of the parts described above, the decision support analytics functions accesses the collected reliability data from one or more reliability datastores to process the accessed data and provide monitoring results in a form of actionable decision support information using the reliability model, wherein the actionable decision support information comprises a list of bad actors, wherein the bad actors are determined by applying reliability rules to a usage interval between a part installation and a part failure and wherein the reliability rules comprise at least two of:

i. determining whether the usage interval between past part installation and subsequent past part failure is less than a first threshold;

ii. determining whether two consecutive usage intervals between past part installations and subsequent past part failures are both less than a second threshold;

iii. determining whether three consecutive usage intervals between past part installations and subsequent past part failures are all less than a third threshold; and iv. determining whether at least four out of five consecutive usage intervals between past part installations and subsequent past part failures are all less than the third threshold.

2. The method for monitoring of reliability data for a plurality of assets and plurality of parts of claim 1, wherein the first, the second, and the third thresholds are computed based on the reliability model using at least one tuning parameter, the tuning parameter makes the thresholds smaller or larger depending on the tuning parameter value and allows to establish desired false positive rates for a bad actor detection according to the reliability model.

3. The method for monitoring of reliability data for a plurality of assets and plurality of parts of claim 1, wherein the reliability model describes probability of failure of a part belonging to the plurality of the parts depending on part usage and other relevant factors, the reliability model is fitted to the collected reliability data by iteratively computing the list of the bad actors and excluding the data for the computed bad actors from a next iteration of the reliability model fitting to the data.

4. The method for monitoring of reliability data for a plurality of assets and plurality of parts of claim 3, wherein a probability of a part failure is determined based, at least in part, on the part usage, operating conditions, repair conditions, repair type, initial state of the part when installed in the asset, usage pattern and ambient conditions.

5. The method for monitoring of reliability data for a plurality of assets and plurality of parts of claim 1, wherein the part usage data further comprises at least one of: time in operation, usage time, operation cycles, missions, vehicle trips, vehicle mileage, operation hours, operation starts, time of active operation, usage intensity, and usage in previous reliability period.

6. The method for monitoring of reliability data for a plurality of assets and plurality of parts of claim 1, wherein the reliability data are obtained by applying a cleanup procedure that flags bad data records that are inconsistent, suspected to be spurious, contain manual data entry errors, or are otherwise unsuitable for the modeling, wherein the flagged bad data records are either modified to correct the data or are excluded from the modeling.

7. The method for monitoring of reliability data for a plurality of assets and plurality of parts of claim 1, wherein the method is embodied into a software executed by one or more computing systems.

8. The method for monitoring of reliability data for a plurality of assets and plurality of parts of claim 1, wherein the one or more reliability datastores comprise data files, databases, or data sets transmitted over the network, that are accessed by the modeling analytics and decision support analytics.

9. A non-transitory computer-readable medium embodying a set of computer-executable instructions, which, when executed in connection with a computerized system comprising a central processing unit and a memory, cause the computerized system to perform a method for monitoring of reliability data for a plurality of assets and plurality of parts, each asset is associated with a unique asset serial number and comprises at least one part, wherein the at least one part in the each asset is associated with a unique part serial number, failed parts are replaced other parts of the plurality of parts of the same type, at least two of the failed parts are removed from the asset, repaired, and installed to the same or another asset of the plurality of assets, the assets are sustained over a period of time wherein sustainment process comprises repairs and replacements of failed asset parts to support continuing asset operation after the sustainment, the method comprising:

a. collecting reliability data for the sustainment of the plurality of assets and the plurality of parts over a period of time and storing the collected reliability data in one or more reliability datastores, wherein the collected reliability data comprises:

i. reliability event data comprising data on part installations and removals for the plurality of assets and information on whether part removal was caused by a part failure or other reason;

ii. part usage data comprising data on usage of part or asset in the operation on the interval between the install and removal of the part or on the interval between the part install and given time; and iii. part or asset serial number data or equivalent data for each reliability event; and b. modeling analytics function and decision support analytics function, the modeling analytics function computes a reliability model describing failure probabilities for the plurality of the parts described above, the decision support analytics functions accesses the collected reliability data from one or more reliability datastores to process the accessed data and provide monitoring results in a form of actionable decision support information using the reliability model, wherein the actionable decision support information comprises a list of bad actors, wherein the bad actors are determined by applying reliability rules to a usage interval between a part installation and a part failure and wherein the reliability rules comprise at least two of:

i. determining whether the usage interval between past part installation and subsequent past part failure is less than a first threshold;
ii. determining whether two consecutive usage intervals between past part installations and subsequent past part failures are both less than a second threshold;
iii. determining whether three consecutive usage intervals between past part installations and subsequent past part failures are all less than a third threshold; and
iv. determining whether at least four out of five consecutive usage intervals between past part installations and subsequent past part failures are all less than the third threshold.

10. The non-transitory computer-readable medium of claim 9, wherein the first, the second, and the third thresholds are computed based on the reliability model using at least one tuning parameter, the tuning parameter makes the thresholds smaller or larger depending on the tuning parameter value and allows to establish desired false positive rates for a bad actor detection according to the reliability model.

11. The non-transitory computer-readable medium of claim 9, wherein the reliability model describes probability for part failure depending on part usage and other relevant factors, the reliability model is fitted to the collected reliability data by iteratively computing the list of the bad actors and excluding the data for the computed bad actors from a next iteration of the reliability model fitting to the data.

12. The non-transitory computer-readable medium of claim 11, wherein a probability of a part failure is determined based, at least in part, on the part usage, operating conditions, repair conditions, repair type, initial state of the part when installed in the asset, usage pattern and ambient conditions.

13. The non-transitory computer-readable medium of claim 9, wherein the part usage data further comprises at least one of: time in operation, usage time, operation cycles, missions, vehicle trips, vehicle mileage, operation hours, operation starts, time of active operation, usage intensity, and usage in previous reliability period.

14. The non-transitory computer-readable medium of claim 9, wherein the reliability data are obtained by applying a cleanup procedure that flags bad data records that are inconsistent, suspected to be spurious, contain manual data entry errors, or are otherwise unsuitable for the modeling, wherein the flagged bad data records are either modified to correct the data or are excluded from the modeling.

15. The non-transitory computer-readable medium of claim 9, wherein the one or more reliability datastores comprise data files, databases, or data sets transmitted over the network, that are capable of being accessed by the modeling analytics and decision support analytics.

16. A computerized system for monitoring of reliability data for a plurality of assets and plurality of parts, each asset is associated with a unique asset serial number and comprises at least one part, wherein the at least one part in the each asset is associated with a unique part serial number, a failed part is replaced by another part of the plurality of parts of the same type, at least two of the failed parts are removed from the asset, repaired, and installed to the same or another asset of the plurality of assets, the assets are sustained over a period of time wherein sustainment process comprises repairs and replacements of failed asset parts to support continuing asset operation after the sustainment, the computerized system comprising a central processing unit and a memory storing a set of computer-executable instructions for:
 a. collecting reliability data for the sustainment of the plurality of assets and the plurality of parts over a period of time and storing the collected reliability data in one or more reliability datastores, wherein the collected reliability data comprises:
  i. reliability event data comprising data on part installations and removals for the plurality of assets and information on whether part removal was caused by a part failure or other reason;
  ii. part usage data comprising data on usage of part or asset in the operation on the interval between the install and removal of the part or on the interval between the part install and given time; and
  iii. part or asset serial number data or equivalent data for each reliability event; and
 b. modeling analytics function and decision support analytics function, the modeling analytics function computes a reliability model describing failure probabilities for the plurality of the parts described above, the decision support analytics functions accesses the collected reliability data from one or more reliability datastores to process the accessed data and provide monitoring results in a form of actionable decision support information using the reliability model, wherein the actionable decision support information comprises a list of bad actors, wherein the bad actors are determined by applying reliability rules to a usage interval between a part installation and a part failure and wherein the reliability rules comprise at least two of:
  i. determining whether the usage interval between past part installation and subsequent past part failure is less than a first threshold;
  ii. determining whether two consecutive usage intervals between past part installations and subsequent past part failures are both less than a second threshold;
  iii. determining whether three consecutive usage intervals between past part installations and subsequent past part failures are all less than a third threshold; and
 c. determining whether at least four out of five consecutive usage intervals between past part installations and subsequent past part failures are all less than the third threshold.

* * * * *